UNITED STATES PATENT OFFICE.

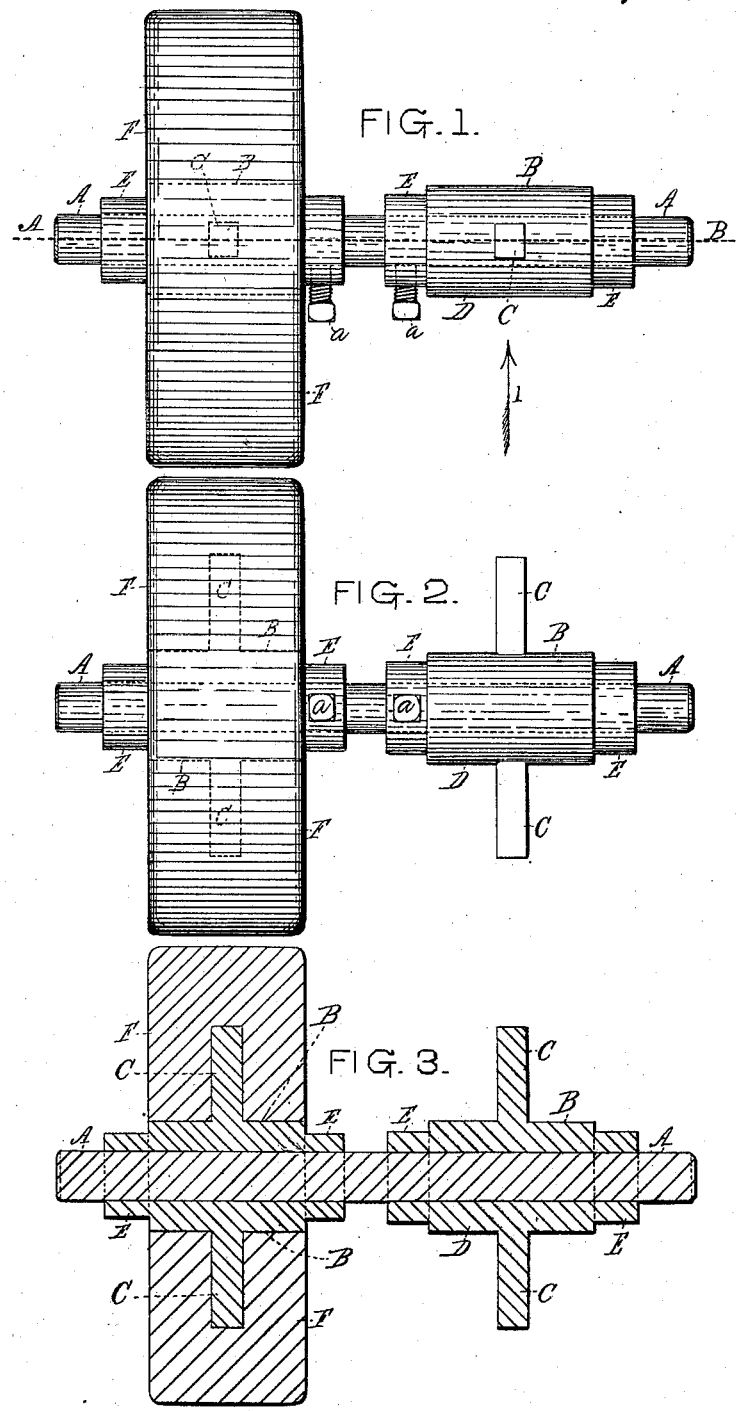

CHARLES C. WEBBER, OF HOLYOKE, MASSACHUSETTS, ASSIGNOR TO JOEL S. WEBBER, OF SAME PLACE.

IMPROVEMENT IN FULLING-ROLLS.

Specification forming part of Letters Patent No. 203,680, dated May 14, 1878; application filed November 19, 1877.

*To all whom it may concern:*

Be it known that I, CHARLES C. WEBBER, of Holyoke, in the county of Hampden and Commonwealth of Massachusetts, have invented certain new and useful Improvements in Fulling-Rolls; and I do hereby declare that the following is a full, clear, and exact description of the same, reference being had to the accompanying drawings, forming a part of this specification, and in which—

Figure 1 represents a top or plan view of one of my improved fulling-rolls. Fig. 2 represents a side view of the roll shown in Fig. 1; and Fig. 3 represents a vertical central section on line A B, Fig. 1.

To enable those skilled in the art to which my invention belongs to make and use the same, I will proceed to describe it more in detail.

In the drawings, the part marked A represents the shaft upon which the rolls are secured, and this shaft may be of any desired length for receiving the requisite number of rolls to be arranged thereon. The rolls used are of from twenty-four (24) to thirty (30) inches in diameter, with six (6) to ten (10) inch face.

Previous to my invention such rolls had been made of iron, but were objectionable on account of rusting. Brass-faced iron rolls had been used; but their expense was very great and were otherwise objectionable. Various kinds of wood rolls had been used; but the varying hardness of wood, liability of decay, and other causes soon affected their surfaces, rendering them uneven and unfit for use, thereby requiring frequent re-turning and renewing.

To obviate the foregoing objections, and to produce a roll at a moderate expense which should be at the same time almost indestructible, is the object of my present invention, and which roll is produced as follows: A metallic spider, B, provided with arms C, central supporting part D, and projecting shoulders or hubs E, is first made from iron or other suitable metal, having an even hole through the center to receive the shaft A. After the spider has been prepared as above stated, a plastic material or compound, composed of fine sand and cement, thoroughly mixed and moistened with water of the proper consistency for molding, is tamped and worked into the mold around the spider and left to set and dry a few hours, after which it is taken from the mold (which should be made in sections for convenience of removal from the unhardened roll) and laid aside for the completion of the drying and hardening process, and I recommend a daily showering with water for a few weeks while the drying and hardening process is going on.

If preferred, the drying and hardening process may be expedited by subjecting the rolls to artificial heat by means of warm vapor.

It will be understood that the mold is to be of the proper shape to produce the roll F; consequently the roll is ready for use without further manipulation as soon as the drying and hardening process is completed.

The proportions of sand and cement used in making the plastic material from which the rolls are molded are one-half each, by weight or bulk, as preferred, the main object being to produce a roll for fulling-mill, or for similar purposes, formed from plastic stone-like material, as above described, and consequently the proportions of the materials may be varied to a considerable extent, and therefore I do not confine myself to particular proportions so long as the object in view is attained.

Set-screws *a* are employed for securing the spider B, upon which the rolls F are molded, to the shaft A.

Having described my improvement, what I claim therein as new and of my invention, and desire to secure by Letters Patent, is—

As an improved article of manufacture, a fulling-machine roll composed of the metallic spider B and molded roll part F, substantially as shown and described, and for the purposes set forth.

CHARLES C. WEBBER.

Witnesses:
E. W. CHAPIN,
M. L. CHAPIN.